(12) United States Patent
Hipke et al.

(10) Patent No.: US 12,455,366 B2
(45) Date of Patent: Oct. 28, 2025

(54) RADAR MEASUREMENT METHOD

(71) Applicant: Robert Bosch GmbH, Stuttgart (DE)

(72) Inventors: Arthur Hipke, Leonberg (DE);
Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 444 days.

(21) Appl. No.: 18/055,258

(22) Filed: Nov. 14, 2022

(65) Prior Publication Data

US 2023/0168360 A1    Jun. 1, 2023

(30) Foreign Application Priority Data

Nov. 30, 2021   (DE) ............... 10 2021 213 495.5

(51) Int. Cl.
  *G01S 13/58*   (2006.01)
  *G01S 13/34*   (2006.01)
  *G01S 13/931*  (2020.01)

(52) U.S. Cl.
  CPC ............ *G01S 13/584* (2013.01); *G01S 13/34* (2013.01); *G01S 13/931* (2013.01)

(58) Field of Classification Search
  CPC .... G01S 13/931; G01S 13/343; G01S 13/584; G01S 13/34; G01S 7/356;
  (Continued)

(56) References Cited

U.S. PATENT DOCUMENTS 4,691,204 A * 9/1987 Hiramoto ............... G01S 13/14
                                                             342/134

7,508,336 B2 * 3/2009 Leskiw ................ G01S 13/726
                                                             342/96
(Continued)

FOREIGN PATENT DOCUMENTS

| DE | 102014212280 A1 | 12/2015 |
| DE | 102014223990 A1 | 5/2016 |
| DE | 102017200317 A1 | 7/2018 |

OTHER PUBLICATIONS

Capon, "High-Resolution Frequency-Wavenumber Spectrum Analysis," Proceedings of the IEEE, vol. 57, No. 8, 1969, pp. 1408-1418.
(Continued)

*Primary Examiner* — Michael W Justice
(74) *Attorney, Agent, or Firm* — NORTON ROSE FULBRIGHT US LLP (57) ABSTRACT

A method and device for determining a relative velocity of a radar target. An FMCW radar measurement is carried out in which a ramp-shaped frequency-modulated transmit signal is sent whose modulation pattern includes a first sequence of ramps succeeding one another offset by a time interval and at least one further sequence of ramps succeeding one another offset by the same time interval, the sequences being temporally interleaved. Received signals are mixed down to baseband signals. From the baseband signals, a two-dimensional spectrum is calculated separately for each of the sequences by two-dimensional Fourier transformation, transformation taking place ramp for ramp in the first dimension and transformation taking place via a ramp index in the second dimension. Based on the positions of a peak in at least two of the two-dimensional spectra of the baseband signals, a value is determined for the relative velocity of a radar target.

9 Claims, 6 Drawing Sheets

(58) Field of Classification Search
CPC ..... G01S 2013/0245; G01S 2013/0254; G01S 2013/0263
USPC .................................. 342/70, 112, 128, 157
See application file for complete search history.

(56) References Cited

U.S. PATENT DOCUMENTS

| | | | | |
|---|---|---|---|---|
| 7,652,617 | B2* | 1/2010 | Kurtz | G01S 13/34 |
| | | | | 342/64 |
| 9,383,442 | B2* | 7/2016 | Hampikian | G01S 13/584 |
| 9,983,294 | B2* | 5/2018 | Oshima | G01S 13/58 |
| 10,649,076 | B2* | 5/2020 | Schoor | G01S 13/583 |
| 10,871,562 | B2* | 12/2020 | Trummer | G01S 13/4454 |
| 11,047,970 | B2* | 6/2021 | Bharadwaj | G01S 13/343 |
| 11,092,686 | B2* | 8/2021 | Rajendran | G01S 13/588 |
| 11,372,079 | B2* | 6/2022 | Corbett | G01S 13/937 |
| 11,435,443 | B2* | 9/2022 | Santra | G01S 13/72 |
| 11,555,920 | B2* | 1/2023 | Longman | G01S 13/60 |
| 11,733,368 | B2* | 8/2023 | Schoor | G01S 13/583 |
| | | | | 342/115 |
| 2007/0164897 | A1* | 7/2007 | Leskiw | G01S 13/726 |
| | | | | 342/195 |
| 2008/0106460 | A1* | 5/2008 | Kurtz | G01S 13/34 |
| | | | | 342/99 |
| 2015/0323660 | A1* | 11/2015 | Hampikian | G01S 13/347 |
| | | | | 342/109 |
| 2015/0338505 | A1* | 11/2015 | Oshima | G01S 13/66 |
| | | | | 342/107 |
| 2017/0293028 | A1* | 10/2017 | Trummer | G01S 13/345 |
| 2018/0321368 | A1* | 11/2018 | Bharadwaj | G01S 13/931 |
| 2019/0353769 | A9* | 11/2019 | Schoor | G01S 13/0209 |
| 2019/0353770 | A1* | 11/2019 | Schoor | G01S 13/583 |
| 2020/0088867 | A1* | 3/2020 | Rajendran | G01S 13/60 |
| 2021/0025967 | A1* | 1/2021 | Corbett | G01S 13/937 |
| 2021/0116540 | A1* | 4/2021 | Santra | G06V 40/23 |
| 2022/0128685 | A1* | 4/2022 | Longman | G01S 13/583 |

OTHER PUBLICATIONS

Cox et al., "Robust Adaptive Beamforming," IEEE Transactions on Acoustics, Speech and Signal Processing, vol. 35, No. 10, 1987, pp. 1365-1376.

Van Trees, "Optimum Array Processing—Part IV of Detection, Estimation, and Modulation Theory," John Wiley, Chaoter 7, Adaptive Beamformers, 2002, pp. 710-916.

* cited by examiner

RADAR MEASUREMENT METHOD

CROSS REFERENCE

The present application claims the benefit under 35 U.S.C. § 119 of German Patent Application No. DE 10 2021 213 495.5 filed on Nov. 30, 2021, which is expressly incorporated herein by reference in its entirety.

BACKGROUND INFORMATION

The present invention relates to a method for determining a relative velocity of a radar target. In the method:
(a) an FMCW radar measurement is carried out in which a ramp-shaped frequency-modulated transmit signal is sent whose modulation pattern includes a first sequence of ramps succeeding one another offset by a time interval, and at least one further sequence of ramps succeeding one another offset by the same time interval, the sequences being temporally interleaved,
(b) received signals are mixed down to baseband signals, and from the baseband signals a two-dimensional spectrum is calculated separately for each of the sequences by two-dimensional Fourier transformation, transformation taking place ramp for ramp in the first dimension and transformation taking place via a ramp index in the second dimension, and
(c) on the basis of the positions of a peak in at least two of the two-dimensional spectra of the baseband signals, a value is determined for the relative velocity of a radar target. The present invention further relates to a radar sensor, in particular for motor vehicles, that is designed to carry out this method.

In motor vehicles, FMCM radar sensors are used to acquire the surrounding traffic environment, in particular in order to locate other vehicles. The location results can be used for various assistance functions, for example automatic distance control, automatic collision warning, or the automatic triggering of an emergency braking process when there is an acute danger of collision.

In FMCW (Frequency-Modulated Continuous Wave) radar sensors, a transmit signal is used whose transmit frequency is modulated with a ramp shape, the signal being sent continuously during the run of the ramp. From a received signal, through mixing with the transmit signal a baseband signal is produced that is sampled and evaluated.

The frequency of the baseband signal corresponds to the frequency difference between the signal sent at a given time and the signal received at the same time. Due to the frequency modulation of the transmit signal, this frequency difference is a function of the runtime of the signal from the radar sensor to the object and back, and thus of the distance to the object. However, due to the Doppler effect the frequency difference also contains a portion that results from the relative velocity of the object. The measurement of the frequency difference on a single ramp thus does not yet permit a determination of the distance and of the relative velocity, but rather yields only a linear relation between these quantities. This relation can be represented as a straight line in a distance-velocity diagram (d-v diagram).

Some conventional FMCW radar sensors work with a sequence of identical relatively short ramps, so-called "rapid chirps," that have, relative to their duration, a high frequency swing, and are thus so steep that in the baseband signal the portion of the frequency swing that is a function of the distance dominates. The Doppler shift is then determined by sampling the sequence of the ramps.

In order to permit an unambiguous determination of the relative velocity within a desired measurement range of the relative velocity, an adequately high repetition rate of the ramps is required. In particular, the time offset between two successive short ramps has to be smaller than half the period duration of the Doppler frequency.

In order to enable a precise velocity and distance estimation of radar objects with as small a hardware outlay and computing expense as possible, it has been proposed to use a plurality of sequences of frequency modulation ramps having a temporal distance between the ramps, in which an undersampling of the Doppler shift takes place over the sequence of the ramps, so that the obtained information about the relative velocity contains ambiguity.

German Patent Application No. DE 10 2014 212 280 A1 describes a method of the type mentioned above in which the ambiguity is resolved in that:
on the basis of a position of a peak in at least one two-dimensional spectrum of the baseband signals, values for possible relative velocities of a radar target are determined that are periodic with a prespecified velocity period;
a phase relation between spectral values obtained in each case at the same position in the separately calculated two-dimensional spectra is checked for agreement with phase relations expected for a plurality of the determined periodic values of the relative velocity; and
on the basis of the check, an estimated value for the relative velocity of the radar target is selected from the determined periodic values of the relative velocity.

SUMMARY

An object of the present invention is to provide a method of the type mentioned above with which better detection results can be achieved.

According to an example embodiment of the present invention, the object may be achieved in that each of the two-dimensional spectra formed for the various sequences is transformed by multiplication with a beamforming function that is a function of a velocity variable and of the time offset of the associated sequence to the first of the sequences, and the relative velocity of the radar target is determined on the basis of a coherent sum of the transformed spectra.

With the aid of the beamforming function, the sensitivity of the radar sensor to objects having particular relative velocities can be varied in a targeted manner. Thus, for example the sensitivity of the radar sensor for vehicles traveling in front can be increased, and in this way the range of the radar sensor for this specific object class, and the signal-noise ratio, can be increased. Because vehicles traveling in front will usually have a relative velocity close to zero, the beamforming function is selected such that the radar sensor has maximum sensitivity for objects having the relative velocity zero.

The functional design here is analogous to the principle of beamforming in the transmission and reception of radar signals with an antenna array that has a plurality of antenna elements configured offset to one another. During the transmission of a radar signal, the antenna elements are fed with transmit signals whose phases are shifted by a phase difference proportional to the offset of the antenna elements. This has the consequence that the maximum transmit power is radiated not in the direction of the normal perpendicular to the row of antenna elements, but rather in a direction that forms an angle to this normal that is a function of the phase offset. Likewise, during reception of radar signals the direction of maximum sensitivity of the radar sensor can be determined by multiplying the signals received by the individual antenna elements by a phase factor proportional to the offset of the antenna elements. In this case, the beamforming function is a function of an angle variable that determines the direction of maximum sensitivity, and of the spatial offset of the antenna elements.

In the method provided here according to an example embodiment of the present invention, using an analogous design, with the aid of the beamforming function the sensitivity of the radar sensor for particular relative velocities is increased. Correspondingly, the beamforming function is a function of a velocity variable and of the temporal offset of the sequences of the frequency ramps.

Optionally, the beamforming function can also be realized such that the sensitivity of the radar sensor is reduced for objects having a particular relative velocity. This can be used for example to simplify and to improve object separation in multiple-target scenarios, and/or to facilitate the resolution of ambiguities in the determination of the relative velocity by reducing the sensitivity of the radar sensor for objects that are at rest and are not relevant for the distance regulation, i.e., for objects whose relative velocity is opposite and equal to the absolute velocity of the home vehicle.

In conventional methods, the resolution of ambiguities in the measurement of relative velocities is more difficult above all when, due to the undersampling in the Doppler dimension, there are superpositions between radar targets having different relative velocities. In order to resolve the ambiguities, in the two-dimensional spectra a multiplicity of possible combinations of ambiguity hypotheses then have to be checked, which requires a very high computational outlay. Due to the fact that in the method according to the present invention the sensitivity to objects at rest is reduced, the number of hypotheses to be checked can be significantly reduced. This makes it possible to tolerate a larger degree of undersampling, and correspondingly to increase the temporal spacing of the ramps, and in this way to reduce the computational outlay and the required computing power of the hardware.

In addition, the method according to the present invention may have the advantage that due to the lower sensitivity to targets at rest, the size of the peaks associated with the targets in the spectrum is reduced, and at the same time the frequency and degree of peak superpositions decreases. In this way, in particular the frequency of situations is also reduced in which a peak in a particular cell in the d-V space is masked by a very pronounced peak in a neighbor cell. Advantageous embodiments of the present invention are disclosed herein.

According to an example embodiment of the present invention, preferably, within a respective sequence the successive ramps have the same ramp slope and the same difference of their ramp center frequencies, as well as, particularly preferably, the same frequency swing, the stated difference in the ramp center frequencies optionally being not equal to zero, and ramps that have the same ramp index in the respective sequences having the same ramp slope and the same ramp center frequency, as well as, particularly preferably, the same frequency swing. If, except for the frequency difference from ramp to ramp, optionally selected not equal to zero, the frequency curve of all ramps of all sequences is identical, then the phase relations resulting from the relative velocity of a radar target can be measured particularly accurately.

If the time offset between the sequences and the time spacing of the ramps within a sequence are within the same order of magnitude, then the available measurement time can be used particularly well. Moreover, influences of an object acceleration on the phase relation between the baseband signals of the individual sequences can in this way be kept as small as possible. Moreover, in this way advantageous values for the time offset between the sequences and the time spacing of the ramps within a sequence can be selected that are as "incommensurable" as possible, i.e. are not for example multiples of one another. The resolution of the ambiguity then results in a particularly large measurement range for the relative velocity. Correspondingly, the modulation pattern contains pauses between the ramps. In particular, the modulation pattern preferably has at least one pause that regularly recurs between each two successive ramps of the sequence, with a time interval from pause to pause that is equal to the time interval between the ramps of the sequence.

According to an example embodiment of the present invention, preferably, during a predominant period of time of the modulation pattern, ramps of the respective sequences are configured in alternating fashion, i.e. the sequences largely overlap one another temporally. Preferably, the time offset, assigned to a respective further sequence, between the ramps of the further sequence and the relevant ramps of the first sequence is smaller than twice the time interval between the ramps within a respective sequence, and particularly preferably is smaller than this time interval. The latter means the same as saying that between two successive ramps of the first sequence, a respective ramp of the respective further sequence of ramps is always transmitted.

Further examples of modulation methods and modulation patterns with which the method proposed here can be combined are described in German Patent Application Nos. DE 10 2014 212 280 A1 and DE 10 2017 200 317 A1.

Optionally, an angle estimation can follow the determination of the distances and relative velocities of the objects. An example of a suitable method is described in German Patent Application No. DE 10 2014 223 990 A1.

The method provided here according to the present invention is also suitable in particular for radar sensors in which radar measurements are carried out in time multiplexing or Doppler division multiplexing, with different combinations of transmit and receive antennas. The velocity beamforming and the coherent summation of the spectra then takes place for each of the transmit antennas. Subsequently, the spectra can be summed via the transmit antennas and the receive antennas non-coherently or coherently (with spatial beamforming). In the case of Doppler division multiplexing, following the resolution of the velocity ambiguities a transmitter assignment can also take place, for example according to the method described in German Patent Application No. DE 10 2017 200 317 A1.

BRIEF DESCRIPTION OF THE DRAWINGS

In the following, exemplary embodiments of the present invention are explained in more detail on the basis of the figures.

DETAILED DESCRIPTION OF EXAMPLE EMBODIMENTS

Figure 1:
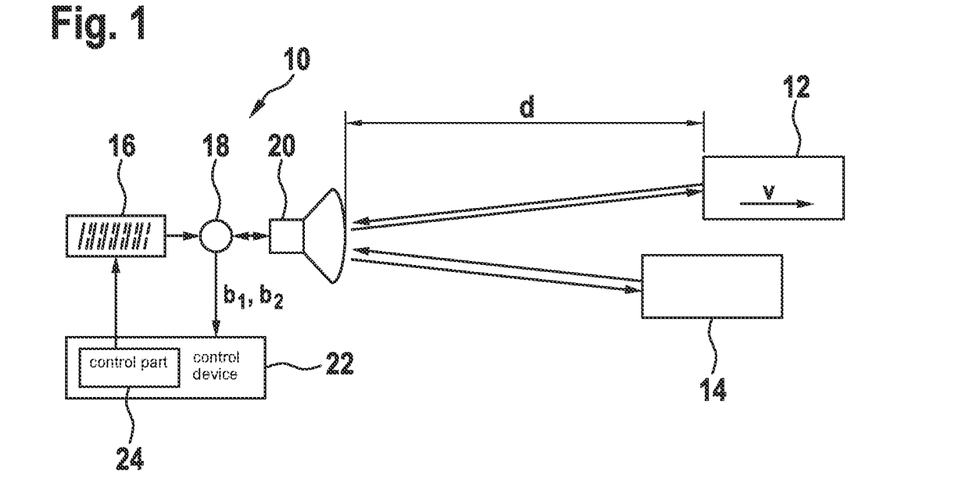
FIG. 1 shows a block diagram of an FMCW radar system, according to an example embodiment of the present invention.

FIG. 1 shows, as a simplified block diagram, an FMCW radar sensor 10 that is for example installed at the front in a motor vehicle, and is used to measure distances d and relative velocities v of objects 12, 14, for example vehicles traveling in front. Radar sensor 10 has a voltage-controlled oscillator 16 that provides a frequency-modulated transmit signal, via a mixer 18, to a transceiver device 20 that sends the signal in the direction towards objects 12, 14. The signal reflected by the objects is received by transceiver device 20 and is mixed in mixer 18 with a portion of the transmit signal. In this way, a baseband signal b is obtained that is further evaluated in an electronic evaluation and control device 22. Control and evaluation device 22 contains a control part 24 that controls the function of oscillator 16. The frequency of the transmit signal provided by the oscillator is modulated within a radar measurement with sequences of rising or falling ramps.

Figure 2:
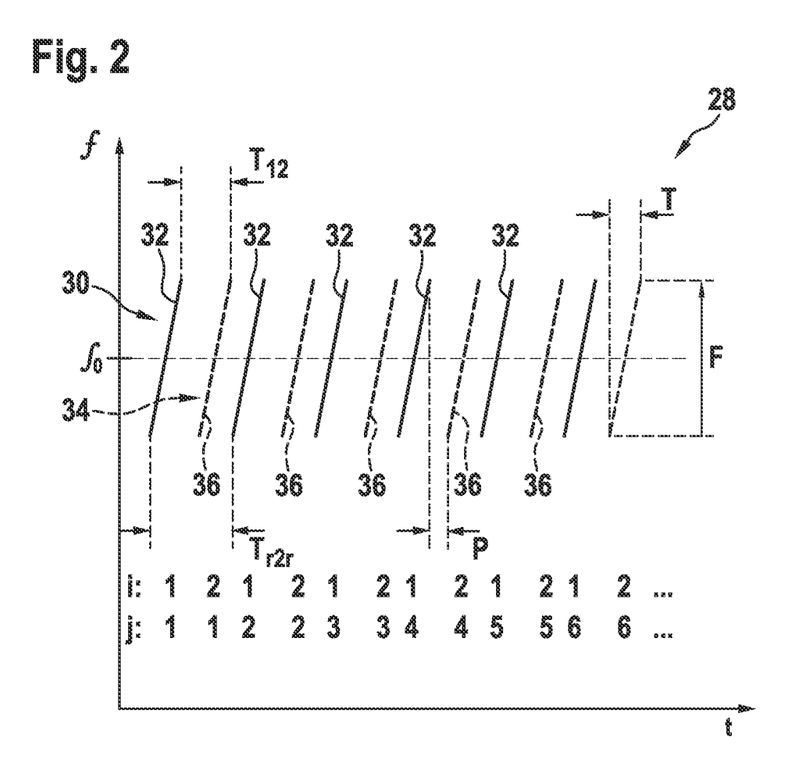
FIG. 2 shows a modulation pattern having two sequences of ramps of the same type, sent with a time offset T12.

FIG. 2 shows the transmit frequency f of transmit signal 28 plotted over time t. During measurement, a transmit antenna is used to send two sequences of ramps having identical ramp parameters, which are temporally interleaved with one another. A first sequence 30 of ramps 32 is shown in FIG. 2 in solid lines, while a second sequence 34 of ramps 36 is shown in dashed lines. The number i of the sequence to which a ramp belongs and the respective ramp index j within a sequence are indicated.

Ramps 36 of second sequence 34 are each shifted by a time offset T12 relative to the ramps 32 of first sequence 30 having the same ramp index j. Within each sequence 30, 34, the successive ramps 32 or 36 are offset to one another by a time spacing Tr2r. Time spacing Tr2r is thus equal for the two sequences. In addition, there is a pause P between each two successive ramps of the sequence.

In the example shown in FIG. 2, the difference of the ramp center frequencies of successive ramps 32 or 36 within a sequence 30, 34 is equal to zero. Therefore, all ramps have the same frequency curve. The ramp center frequency here corresponds to the average transmit frequency $f_0$.

Figure 5:
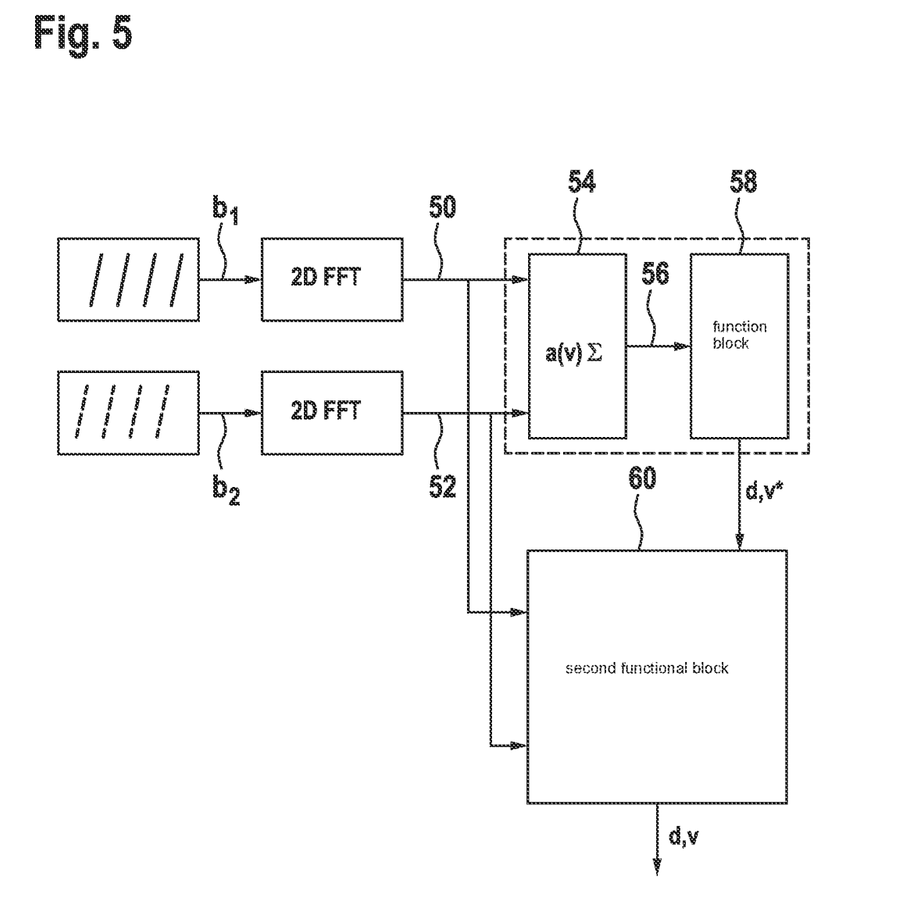
FIG. 5 shows a more detailed block diagram of an evaluating device of an FMCW radar sensor.

FIG. 5 schematically shows a more detailed block diagram of the determination of the relative velocity carried out by control and evaluation unit 22.

The received, sampled baseband signals b1 and b2, obtained in each case for the corresponding sequence 30, 34 of the ramps, are each subjected to a two-dimensional Fourier transformation (2D-FFT). The first dimension corresponds to a transformation of the baseband signals obtained for the individual ramps. The second dimension corresponds to a transformation over the sequence of the ramps, i.e. over the ramp index j. The sizes of the respective transformations, i.e. the respective numbers of bins (sampling points or support points) are preferably uniform for all spectra for the first dimension, and are preferably uniform for all spectra for the second dimension.

Due to the relative velocity of radar target 12 and the time offset T12 between partial measurements corresponding to the individual sequences of ramps, there is a phase difference between the two partial measurements. Here the phase difference is obtained as a phase difference between the complex amplitudes (spectral values) of a peak occurring at the same position in both two-dimensional spectra 50, 52. However, due to the relatively large time offset T12 between the corresponding ramps 32, 36 of the two sequences 30, 34, the determination of the phase difference between the two partial measurements does not permit the relative velocity to be directly inferred. This is because, due to the periodicity of the phases, for an individual phase difference there is an ambiguity in the associated value of the relative velocity.

The obtained two-dimensional spectra 50 or 52 are coherently summed in a first function block 54 with the aid of a "velocity beamformer."

The velocity beamformer makes it possible to amplify or to suppress relevant velocities (for example velocities close to 0 m/s for ACC objects, or velocities close to the negative velocity of the home vehicle for stationary targets). Examples of relevant velocities would be for example velocities close to 0 m/s for ACC objects, or velocities close to the negative velocity of the home vehicle for stationary targets, or also velocities of targets that were recognized as particularly relevant in the object tracking. For the beamforming, the speed beamformer can use one of the numerous beamforming methods described in various literature (see for example: H. L. Van Trees, "Optimum array processing—Part IV of detection, estimation, and modulation theory," John Wiley, 2002; J. Capon, "High-Resolution Frequency-Wavenumber Spectrum Analysis," Proceedings of the IEEE, 1969, vol. 57, pp. 1408-1418; or H. Cox, R. Zeskind, and M. Owen, "Robust adaptive beamforming," IEEE Transactions on Acoustics, Speech and Signal Processing, vol. 35, no. 10, pp. 1365-1376, 1987), such as delay-and-sum or conventional beamforming, minimum variance distortionless response (MVDR) or capon beamforming, or null steering.

The definition set of each of the two-dimensional spectra 50, 52 is a two-dimensional raster of distance-velocity bins (d-v bins), to each of which is assigned a particular value of a distance variable d and a velocity variable v of an object. The value set of the spectrum is a set of complex numbers that indicate, for each d-v bin, the complex amplitude of the Fourier-transformed signal. In the above-named beamforming methods, in general the spectral value, i.e. the complex amplitude in each bin, is multiplied with a beamforming function that is a function of the velocity variables v and of the time offset of the sequence. The form of this beamforming function will vary depending on the beamforming method applied.

For example, in the delay-and-sum method for the velocity variable v and N sequences (in the example shown in FIGS. 2 and 5, N=2), a vectorial beamforming function ai(v) is used that has the following form:

$$a_i(v) = (1/\sqrt{N})\exp(2\pi j(2/c)f_0 t_i v) \tag{1}$$

Here, j is the imaginary unit, i is an index that numbers the sequences (i=1 . . . N), $f_0$ is the center frequency of the ramps, and $t_i$ ($=(i-1)(T_{12})$) is the time offset between the first ramp and the i-th ramp (in the example of FIGS. 2 and 5, i has only the values 1 and 2, and $t_1=0$ and $t_2=T_{12}$).

The spectra converted through multiplication with the beamforming function are then coherently summed over the sequence index i. As a result, the signal-noise ratio is increased by the factor N.

As a further example, the MVDR beamforming method, with which the sensitivity for a particular velocity $v_0$ can be suppressed in a targeted manner, will be briefly sketched. This method uses a beamforming function $w(v, v_0)$ that has the following form:

$$d(v;v_0)=(R^{-1}(v_0)a(v))/(a^H(v)R^{-1}(v_0)a(v))$$

$$R(v_0)=a(v_0)a^H(v_0)+\sigma I \quad (2)$$

Here, $R(v_0)$ is a correlation matrix, $a(v_0)$ is a vector whose components are defined as in equation (1), and $a^H(v)$ is the Hermitian adjoint vector to $a(v)$. I is the unity matrix of dimension N×N. The term σ I is used to regularize the correlation matrix $R(v_0)$, and ensures that the matrix $R(v_0)$ can be inverted. Here, σ can be selected such that an amplification of the noise is avoided.

In an angle-resolving radar sensor having a plurality of transmit antennas, the beamforming can be applied to the receive signals of each transmit antenna. Subsequently, via the transmit antennas a non-coherent averaging is carried out (a coherent summation is not possible here, because the phases are also a function of the location angle of the object).

The non-coherent summation yields a two-dimensional power spectrum 56. In a function block 58, the detection of the targets then takes place using conventional methods such as CFAR (Constant False Alarm Rate).

The position of a peak corresponding to a radar target 12 in the power spectrum 56, indicated in the following as bin k, l, corresponds to the position of the peak in the individual spectra 50, 52. From the first dimension, corresponding to the bin k of the position of the peak, a linear relation between the relative velocity v and the distance d of the radar target is obtained according to the FMCW equation $k=2/c(d\ F+f_0\ v\ T)$. Here, c is the speed of light, F is the ramp swing, T is the ramp duration of an individual ramp 32 or 36, and $f_0$ is the average transmit frequency.

Figure 3:
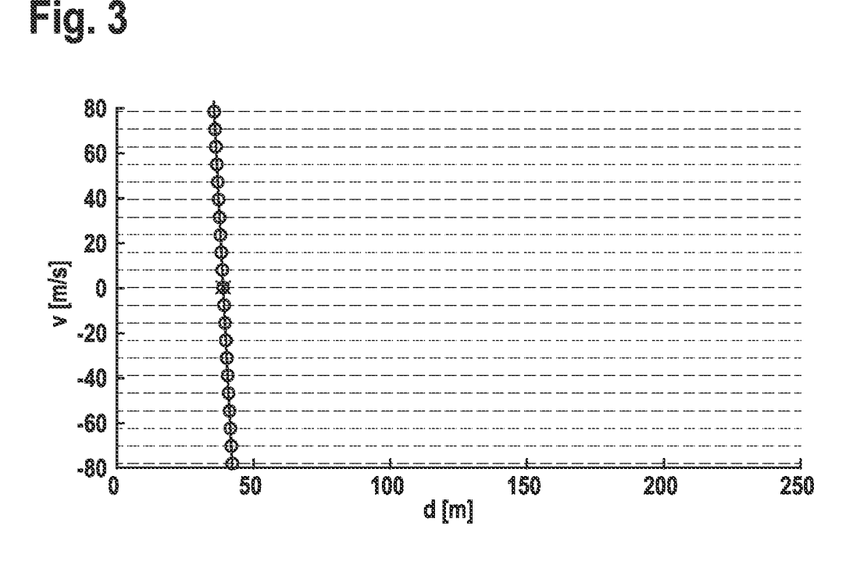
FIG. 3 shows a velocity/distance diagram having a predetermined interval periodic values of the relative velocity of a radar target.

FIG. 3 schematically shows a diagram in which the relative velocity v is plotted over the distance d. The linear relation between v and d is shown as a straight line. In the depicted example, due to a relatively large time spacing Tr2r, the information obtained from the sampling of the Doppler frequency about the relative velocity of the radar target has an ambiguity in accordance with a predetermined interval, because the Doppler frequency resulting from the relative movement with velocity v is not unambiguously sampled by the relatively large time spacings Tr2r. In addition to the v-d straight line, which results according to the frequency bin k, the periodic values of the relative velocity v, determined from frequency bin l, are shown by dashed lines. The points of intersection with the v-d straight lines are shown. They correspond to possible value pairs (v, d) of the relative velocity and the distance of the detected radar target 12. The actual target whose velocity v is to be determined is marked with an X in FIG. 3.

The ambiguity of the ascertained velocity v is now resolved as explained in the following. The information v* about the relevant periodic values of the relative velocity v are given to a second functional block 60 (FIG. 5), which in addition is also given the complex two-dimensional spectra 50, 52 of the partial measurements.

To evaluate the measured phase difference, a control vector of an ideal measurement is calculated as a function of the relative velocity v. The components of this control vector are the same as in equation (1).

A measurement vector is then formed that differs from the control vector in that its components are not formed by the expected velocity-dependent complex values the complex amplitudes (spectral values), but by the actually measured values. The control vector and the measurement vector are then multiplied in scalar fashion in order to determine the degree of agreement. A norming of the product then yields a likelihood function.

Figure 4:
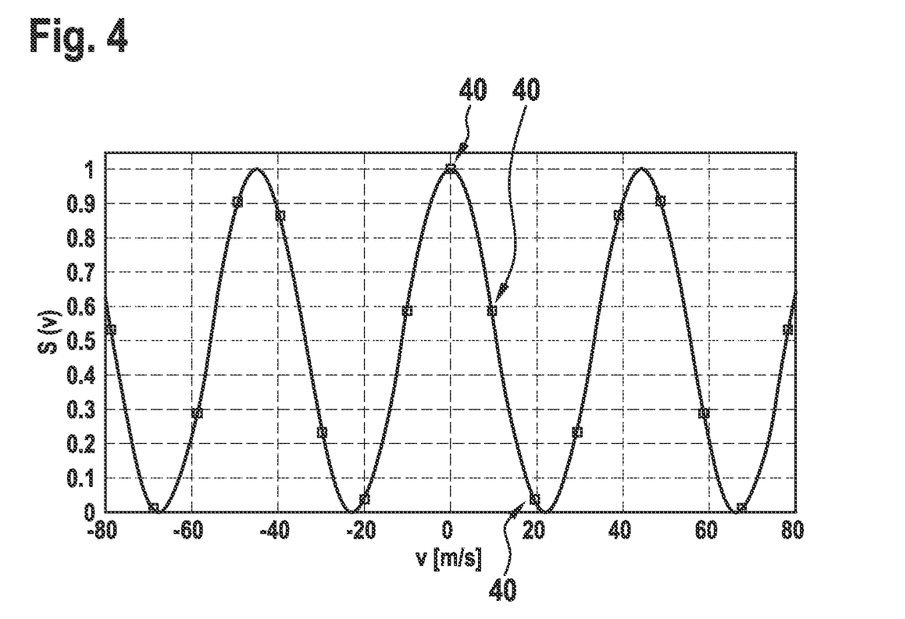
FIG. 4 shows a diagram of a likelihood function for the parameter of the relative velocity.

FIG. 4 shows schematically, with a solid sinusoidal line, the relative velocity spectrum S(v) over the relative velocity v. The maxima of the likelihood function correspond to the most probable values of the parameter v. Taken in itself, the relative velocity spectrum S(v) is ambiguous; a maximum at the maximum value 1 corresponds in each case to an optimal agreement of the ideal phase shifts resulting for the relevant relative velocity v with the measured phase shift according to the measurement vector.

However, an evaluation of the function S(v) is possible only at the locations 40 that correspond to the periodic values of the relative velocity v, obtained from the evaluations according to the position of the peak in the bins (k, l). These locations 40, which correspond to the velocity values of the points of intersection marked in FIG. 3, are marked in FIG. 4 on the curve of the function S(v). In the depicted example, a maximum agreement occurs at a relative velocity v=0 m/s, where the function S(v) assumes the expected maximum value 1. This corresponds to the actual value of the relative velocity v.

The ambiguity resulting from the position of the peak can thus be resolved by the additional information from the phase relation.

Based on the linear relation, an estimated value for the distance d, associated with the selected estimated value for the relative velocity v, is determined.

The second functional block 60 outputs the ascertained estimated values for the relative velocity v and the distance d.

Figure 6:
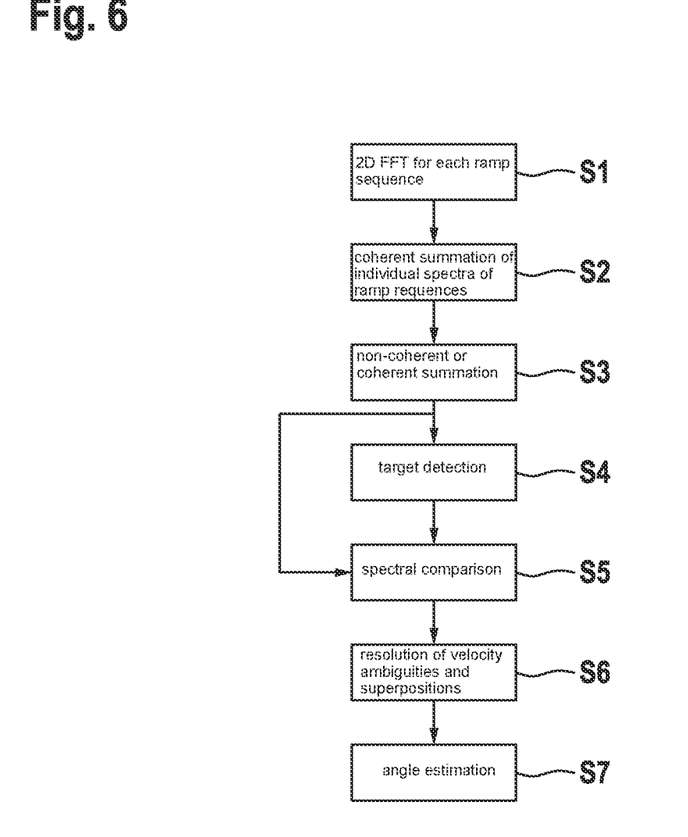
FIG. 6 shows a flow diagram for a method according to an example embodiment of the present invention.

In FIG. 6, the main steps of the method are shown as a flow diagram. In the steps S1 through S7 shown as blocks in FIG. 6, the following actions are carried out:

S1 2D FFT for each ramp sequence (and each receive channel)

S2 coherent summation of the individual spectra of the ramp sequences for each transceiver antenna using velocity beamforming S3 non-coherent or coherent summation of the spectra via the transmit and/or receive antennas S4 target detection using CFAR including peak interpolation S5 spectral power comparison and, if warranted, merging of the detection lists and for all detections S6 resolution of velocity ambiguities and superpositions, as well as, if warranted, transmitter assignment (in Doppler division multiplexing)

S7 angle estimation after phase compensation

A comparison of the spectral power before and after the velocity beamforming, or between different velocity beamformers, provides information as to whether, in this spectral cell, there is only one stationary target (large power difference through beamforming) or whether there may be additional targets (small power difference). This information can be used in three ways:

probability that there is a stationary target;

(additional) criterion for applying a multi-target model in the resolution of the velocity ambiguities, and thus separating signal contributions of stationary targets and moving targets for the subsequent angle estimation;

through the improved accuracy of the peak interpolation, more accurate velocities can be used as a basis in the multi-target model.

Figure 7:
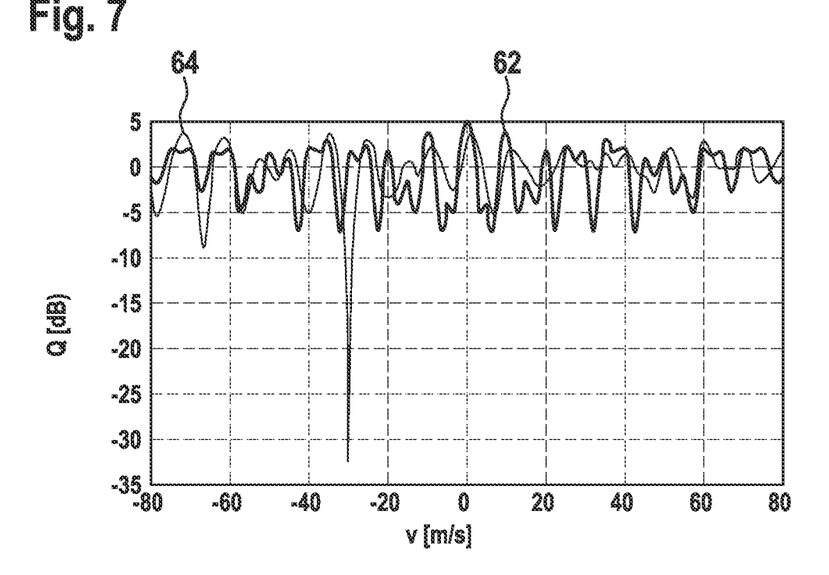
FIG. 7 shows a graphic representation of the functional dependence of the sensitivity of the radar sensor at different velocities.
Figure 8:
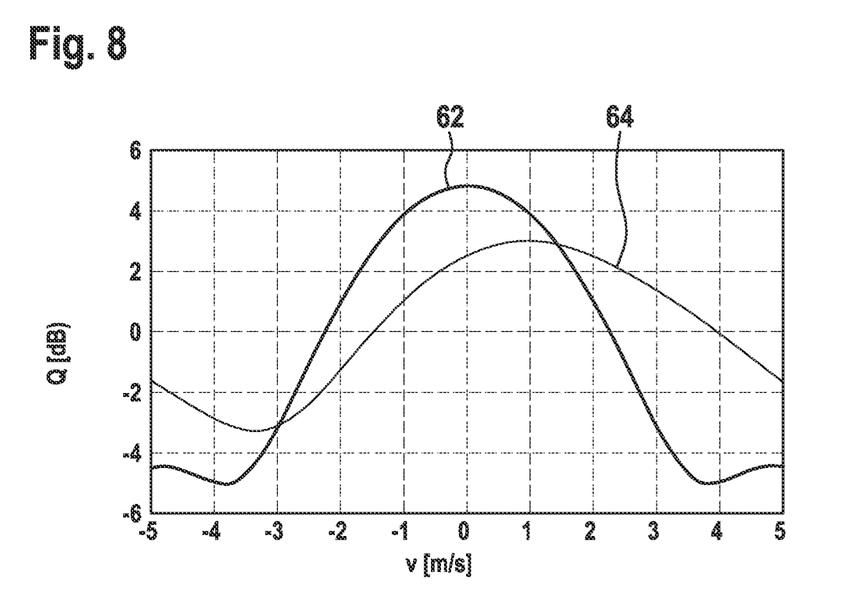
FIGS. 8 and 9 show enlarged details from FIG. 7.
Figure 9:
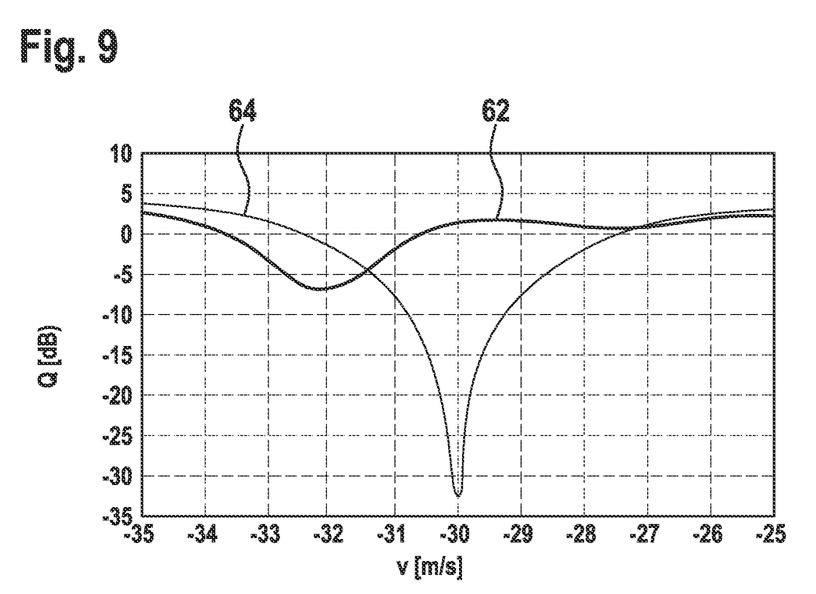

In FIGS. 7 through 9, the effect achieved by the velocity beamforming is shown. In these diagrams, in each case the relative receive power Q is plotted against the relative velocity of the located object. The thick curve 62 shows in each case the results for the delay-and-sum method, while the thinner curve shows the results for the MVDR method.

FIG. 8 shows the range of the relative velocities in the vicinity of the value zero with high resolution. Here it can be seen that the relative receive power, and thus the sensitivity of the sensor, is significantly increased at the relative velocity zero.

In the MVDR method, the parameters have been selected such that the sensitivity and relative velocities in the vicinity of −30 m/s (stationary targets with a velocity of the home vehicle of 30 m/s) is reduced. In FIG. 9, this velocity range is shown with higher resolution. The pronounced minimum of curve 64 at v=−30 m/s can be seen clearly. Through this suppression of stationary targets, the target detection is significantly improved, and the resolution of ambiguities in steps S4 through S6 is supported with the aid of the spectral power comparison.

What is claimed is:

1. A method for determining a relative velocity of a radar target, the method comprising:
    (a) carrying out an FMCW radar measurement in which a ramp-shaped frequency-modulated transmit signal is sent whose modulation pattern includes a first sequence of ramps succeeding one another offset by a time interval, and at least one further sequence of ramps succeeding one another offset by the time interval, the first and the at least one further sequences being temporally interleaved;
    (b) mixing down received signals to baseband signals, and, from the baseband signals, calculating a two-dimensional spectrum separately for each of the first and at least one further sequences by two-dimensional Fourier transformation, transformation taking place ramp for ramp in a first dimension, and transformation taking place via a ramp index in s second dimension,
    (c) based on positions of a peak in at least two of the two-dimensional spectra of the baseband signals, determining a value for the relative velocity of a radar target;
    wherein each spectra of the two-dimensional spectra formed for the first and the at least one further sequences is transformed by multiplication with a beamforming function that is a function of a velocity variable and of a time offset of the first and the at least one further associated sequences to the first of the sequences, and the relative velocity of the radar target is determined based on a coherent sum of the transformed spectra.

2. The method as recited in claim 1, wherein the beamforming function is formed according to a delay-and-sum method.

3. The method as recited in claim 1, wherein the beamforming function is formed according to a minimum variance distortionless response (MVDR) method.

4. The method as recited in claim 1, wherein, for radar sensors having a plurality of transmit antennas and/or a plurality of receive antennas, after the coherent summation of the transformed spectra, a non-coherent or coherent summation via the transmit and/or receive antennas takes place, and a detection of individual radar targets takes place based on a result of the non-coherent or coherent summation.

5. The method as recited in claim 1, wherein the time interval with which the ramps of an individual sequence of the first and the at least one further sequences succeed one another is selected such that an undersampling takes place in the second dimension, and in which the resolution of resulting ambiguities takes place based on the transformed spectra.

6. The method as recited in claim 1, wherein, for a radar sensor that moves with an own velocity relative to its environment, the beamforming function is selected such that sensitivity of the radar sensor is reduced for targets whose relative velocity is opposite and equal to the own velocity of the sensor.

7. The method as recited in claim 1, wherein the beamforming function is selected such that sensitivity of the radar sensor is increased for targets that have a relative velocity zero.

8. A method for determining a relative velocity of a radar target, the method comprising:
    (a) carrying out an FMCW radar measurement in which a ramp-shaped frequency-modulated transmit signal is sent whose modulation pattern includes a first sequence of ramps succeeding one another offset by a time interval, and at least one further sequence of ramps succeeding one another offset by the time interval, the first and the at least one further sequences being temporally interleaved;
    (b) mixing down received signals to baseband signals, and, from the baseband signals, calculating a two-dimensional spectrum separately for each of the first and at least one further sequences by two-dimensional Fourier transformation, transformation taking place ramp for ramp in a first dimension, and transformation taking place via a ramp index in s second dimension,
    (c) based on positions of a peak in at least two of the two-dimensional spectra of the baseband signals, determining a value for the relative velocity of a radar target;
    wherein each spectra of the two-dimensional spectra formed for the first and the at least one further sequences is transformed by multiplication with a beamforming function that is a function of a velocity variable and of a time offset of the first and the at least one further associated sequences to the first of the sequences, and the relative velocity of the radar target is determined based on a coherent sum of the transformed spectra,
    wherein the time interval with which the ramps of an individual sequence of the first and the at least one further sequences succeed one another is selected such that an undersampling takes place in the second dimension, and in which the resolution of resulting ambiguities takes place based on the transformed spectra,
    wherein, a distinction is made between single-target scenarios and multiple-target scenarios based on comparison of spectral power in the transformed and non-transformed spectra.

9. An FMCW radar sensor, comprising:
    a control and evaluator configured to determining a relative velocity of a radar target, the control and evaluator configured to:
        (a) carry out an FMCW radar measurement in which a ramp-shaped frequency-modulated transmit signal is sent whose modulation pattern includes a first sequence of ramps succeeding one another offset by a time interval, and at least one further sequence of ramps succeeding one another offset by the time interval, the first and the at least one further sequences being temporally interleaved;

(b) receive the signals converted to baseband signals, via a mixer, and, from the baseband signals, calculate a two-dimensional spectrum separately for each of the first and at least one further sequences by two-dimensional Fourier transformation, transformation taking place ramp for ramp in a first dimension, and transformation taking place via a ramp index in s second dimension,
(c) based on positions of a peak in at least two of the two-dimensional spectra of the baseband signals, determine a value for the relative velocity of a radar target;
wherein each spectra of the two-dimensional spectra formed for the first and the at least one further sequences is transformed by multiplication with a beamforming function that is a function of a velocity variable and of a time offset of the first and the at least one further associated sequences to the first of the sequences, and the relative velocity of the radar target is determined based on a coherent sum of the transformed spectra.

\* \* \* \* \*